United States Patent
Hatanaka et al.

(10) Patent No.: US 8,134,255 B2
(45) Date of Patent: Mar. 13, 2012

(54) NOISE CANCELLATION CIRCUIT, ANALOG SIGNAL PROCESSING CIRCUIT, AND ELECTRONIC INSTRUMENT

(75) Inventors: Koichi Hatanaka, Nagano (JP); Kazumi Matsumoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1114 days.

(21) Appl. No.: 11/960,334

(22) Filed: Dec. 19, 2007

(65) Prior Publication Data
US 2008/0157863 A1    Jul. 3, 2008

(30) Foreign Application Priority Data
Dec. 28, 2006    (JP) .................................. 2006-354833

(51) Int. Cl.
*H02J 3/24* (2006.01)
*H04B 17/00* (2006.01)
*H04B 1/00* (2006.01)
*H04B 1/10* (2006.01)
*H04M 1/00* (2006.01)

(52) U.S. Cl. ..................... 307/102; 455/63.1; 455/67.13; 455/226.1; 455/296; 455/556.1

(58) Field of Classification Search ................... 307/102; 327/551; 455/67.13, 63.1, 226.1, 296, 556.1
See application file for complete search history.

(56) References Cited

U.S. PATENT DOCUMENTS
| | | |
|---|---|---|
| 5,379,003 A | 1/1995 | Bizen |
| 2006/0280314 A1* | 12/2006 | Okada et al. ................. 381/71.1 |

FOREIGN PATENT DOCUMENTS
| | | |
|---|---|---|
| JP | H06-188729 A | 7/1994 |
| JP | 06-244745 A | 9/1994 |
| JP | 2001-137220 A | 5/2001 |

\* cited by examiner

*Primary Examiner* — Rexford Barnie
*Assistant Examiner* — Toan Vu
(74) *Attorney, Agent, or Firm* — Global IP Counselors, LLP

(57) ABSTRACT

A cancellation signal generation section generates a cancellation signal which cancels an alternating-current component of a power supply terminal voltage of a digital signal processing circuit section, and a synthesis section synthesizes the generated cancellation signal and a power supply voltage of an analog signal processing circuit section to cancel noise superimposed on the power supply voltage.

5 Claims, 6 Drawing Sheets

NOISE CANCELLATION CIRCUIT, ANALOG SIGNAL PROCESSING CIRCUIT, AND ELECTRONIC INSTRUMENT

Japanese Patent Application No. 2006-354833 filed on Dec. 28, 2006, is hereby incorporated by reference in its entirety.

BACKGROUND OF THE INVENTION

The present invention relates to a noise cancellation circuit, an analog signal processing circuit, and an electronic instrument.

When noise is mixed into a signal of an electronic circuit, malfunction, deterioration in characteristics, and the like occur due to the noise. Noise is mixed through various paths such as a signal line connecting electronic circuits or a power supply line of an electronic circuit.

JP-A-6-188729 discloses technology in which noise superimposed on a power supply voltage transmitted through a power supply line is removed using a low-pass filter disposed between a power supply and ground.

However, in order to completely remove high-frequency noise using the technology disclosed in JP-A-6-188729, it is necessary to form a filter using a capacitor with a large capacitance. This results in an increase in parts cost and module size. For example, a circuit area of 1 to 4 $mm^2$ is required when forming a capacitor with a capacitance of 40 microfarads on a substrate.

A minute alternating-current component called a power supply ripple is contained in a power supply, and may cause the characteristics of an electronic circuit to deteriorate. Since the power supply ripple generally has a low frequency, the power supply ripple cannot be removed using the technology disclosed in JP-A-6-188729 which utilizes a low-pass filter.

SUMMARY

According to one aspect of the invention, there is provided a noise cancellation circuit comprising:

a cancellation signal generation section that generates a cancellation signal from a power supply terminal voltage of a first electronic circuit, the cancellation signal canceling an alternating-current component of the power supply terminal voltage; and a synthesis section that synthesizes the cancellation signal and a power supply voltage of a second electronic circuit, the second electronic circuit having a common power supply line and/or ground line with the first electronic circuit.

DETAILED DESCRIPTION OF THE EMBODIMENT

Figure 1:
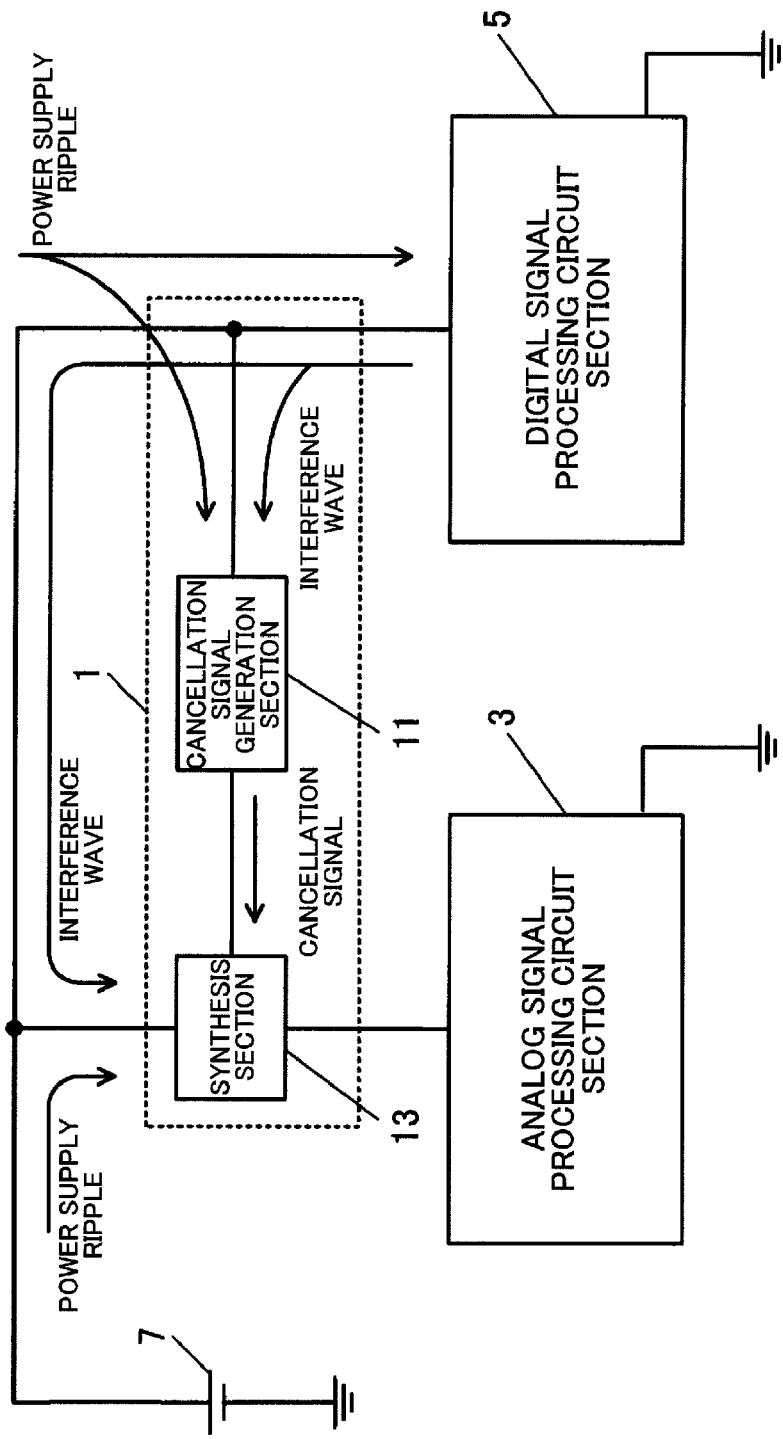
FIG. 1 is a view illustrative of the principle of power supply line noise cancellation.

According to one embodiment of the invention, there is provided a noise cancellation circuit comprising:

a cancellation signal generation section that generates a cancellation signal from a power supply terminal voltage of a first electronic circuit, the cancellation signal canceling an alternating-current component of the power supply terminal voltage; and a synthesis section that synthesizes the cancellation signal and a power supply voltage of a second electronic circuit, the second electronic circuit having a common power supply line and/or ground line with the first electronic circuit.

According to the above configuration, the cancellation signal that is generated by the cancellation signal generation section and cancels the alternating-current component of the power supply terminal voltage of the first electronic circuit is synthesized by the synthesis section with the power supply voltage of the second electronic circuit having a common power supply line and/or ground line with the first electronic circuit, so that noise superimposed on the power supply voltage of the second electronic circuit is canceled.

Since the cancellation signal generation section and the synthesis section can be formed using a small circuit as compared with the case of forming the identical function using a filter utilizing a capacitor, an increase in module size can be prevented. Since the cancellation signal generated by the cancellation signal generation section is a signal that cancels the alternating-current component contained in the power supply terminal voltage of the first electronic circuit, a power supply ripple superimposed on the power supply voltage of the second electronic circuit can also be effectively removed.

In the noise cancellation circuit according to this embodiment, the cancellation signal generation section may include:

an extraction section that extracts the alternating-current component of the power supply terminal voltage of the first electronic circuit; and a phase shifter section that shifts a phase of a signal of the extracted alternating-current component by 180 degrees.

According to the above configuration, the cancellation signal is generated by extracting the alternating-current component of the power supply terminal voltage of the first electronic circuit and shifting the phase of the alternating-current component signal by 180 degrees.

In the noise cancellation circuit according to this embodiment, the first electronic circuit may be a digital signal processing circuit section; and the second electronic circuit may be an analog signal processing circuit section.

According to the above configuration, noise from the digital signal processing circuit section superimposed on the power supply voltage of the analog signal processing circuit section is canceled in combination with the above-described configuration of the noise cancellation circuit.

According to another embodiment of the invention, there is provided an analog signal processing circuit comprising the second electronic circuit that includes the above noise cancellation circuit in a power supply input stage.

According to the above configuration, the module size can be further reduced by providing the noise cancellation circuit in the analog signal processing circuit section.

According to a further embodiment of the invention, there is provided an electronic instrument comprising the above noise cancellation circuit.

Embodiments of the invention are described below with reference to the drawings. Note that the embodiments described below do not in any way limit the scope of the invention laid out in the claims. Note that all elements described below should not be necessarily taken as essential requirements for the invention.

1. Principle

FIG. 1 is a view illustrative of the principle of power supply line noise cancellation according to one embodiment of the invention. The following description is given taking an example in which an analog signal processing circuit section 3 and a digital signal processing circuit section 5 utilize a common power supply.

The analog signal processing circuit section 3 and the digital signal processing circuit section 5 are connected in parallel with a power supply 7 through a common power supply line. Therefore, when an alternating current is generated due to a change in electromagnetic field caused by the circuit operation of the digital signal processing circuit section 5, the alternating current is mixed into the analog signal processing circuit section 3 as an interference wave through the common power supply line.

When the analog signal processing circuit section 3, the digital signal processing circuit section 5, and the power supply 7 utilize a common ground line, an interference wave from the digital signal processing circuit section 5 may be transmitted to the analog signal processing circuit section sides through the ground line.

The power supply voltage of the power supply 7 shows a constant level when measured using a digital multimeter, a tester, or the like. However, a minute fluctuation (alternating-current component) called a power supply ripple is contained in the power supply voltage. The power supply ripple may serve as large noise for a circuit section which handles an analog signal with a small amplitude, for example, thereby causing problems such as deterioration in characteristics.

The analog signal processing circuit section 3 is affected by an interference wave from the digital signal processing circuit section 5 and the power supply ripple of the power supply 7 through the power supply line.

In this embodiment, a noise cancellation circuit 1 is provided between a power supply terminal of the digital signal processing circuit section 5 and a power supply terminal of the analog signal processing circuit section 3 in order to solve the above problem. The noise cancellation circuit 1 includes a cancellation signal generation section 11 and a synthesis section 13. The noise cancellation circuit 1 generates a cancellation signal which cancels an alternating-current component of a power supply terminal voltage of the digital signal processing circuit section 5 using the power supply terminal voltage as an input voltage, and synthesizes the generated cancellation signal with the power supply voltage of the analog signal processing circuit section 3.

Figure 2:
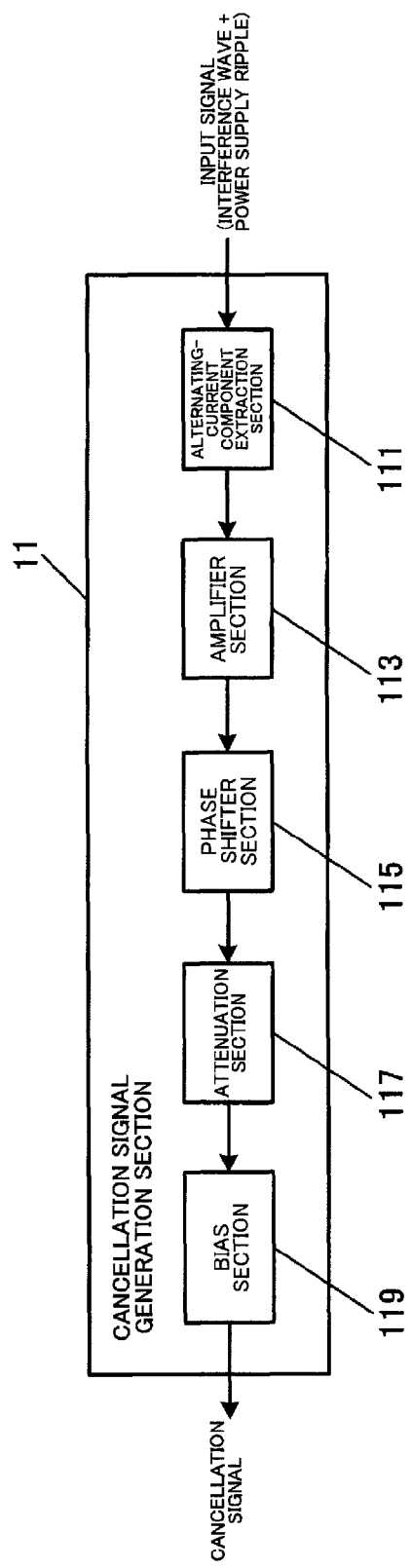
FIG. 2 is a view showing the circuit configuration of a cancellation signal generation section.

FIG. 2 is a view showing an example of the circuit configuration of the cancellation signal generation section 11.

The cancellation signal generation section 11 includes an alternating-current component extraction section 111, an amplifier section 113, a phase shifter section 115, an attenuation section 117, and a bias section 119.

The alternating-current component extraction section 111 includes a bypass capacitor and the like. The alternating-current component extraction section 111 blocks a direct-current component of the power supply terminal voltage (input signal) of the digital signal processing circuit section 5 to extract an alternating-current component signal, and outputs the alternating-current component signal to the amplifier section 113.

The amplifier section 113 is an amplifier which amplifies the alternating-current component signal extracted by the alternating-current component extraction section 111 by a specific amplification factor. The amplifier section 113 outputs the amplified signal to the phase shifter section 115.

The phase shifter section 115 is a phase shifter circuit which shifts the phase of the signal amplified by the amplifier section 113 by 180 degrees. The phase shifter section 115 outputs the phase-shifted signal to the attenuation section 117. The phase shift target frequency is the frequency of an interference wave from the digital signal processing circuit section 5 and the frequency of the power supply ripple contained in the output from the power supply 7.

The attenuation section 117 is an attenuator which attenuates the signal phase-shifted by the phase shifter section 115 by a specific attenuation factor. The attenuation section 117 outputs the attenuated signal to the bias section 119.

The bias section 119 is a bias circuit which biases the rated voltage of the power supply 7 to the signal attenuated by the attenuation section 117. The bias section 119 outputs the biased signal to the synthesis section 13 as the cancellation signal.

The synthesis section 13 is an adder which synthesizes the power supply voltage of the analog signal processing circuit section 3 and the cancellation signal generated by the cancellation signal generation section 11.

The cancellation signal output from the cancellation signal generation section 11 is a signal in which the phase of the signal at the frequency of the interference wave and the phase of the signal at the frequency of the power supply ripple are shifted by 180 degrees. Therefore, the interference wave and the power supply ripple superimposed on the power supply voltage can be appropriately removed by synthesizing the cancellation signal and the power supply voltage applied to the analog signal processing circuit section 3. Moreover, since the noise cancellation circuit 1 can be formed using small circuit elements, an increase in module size can be prevented.

Figure 3:
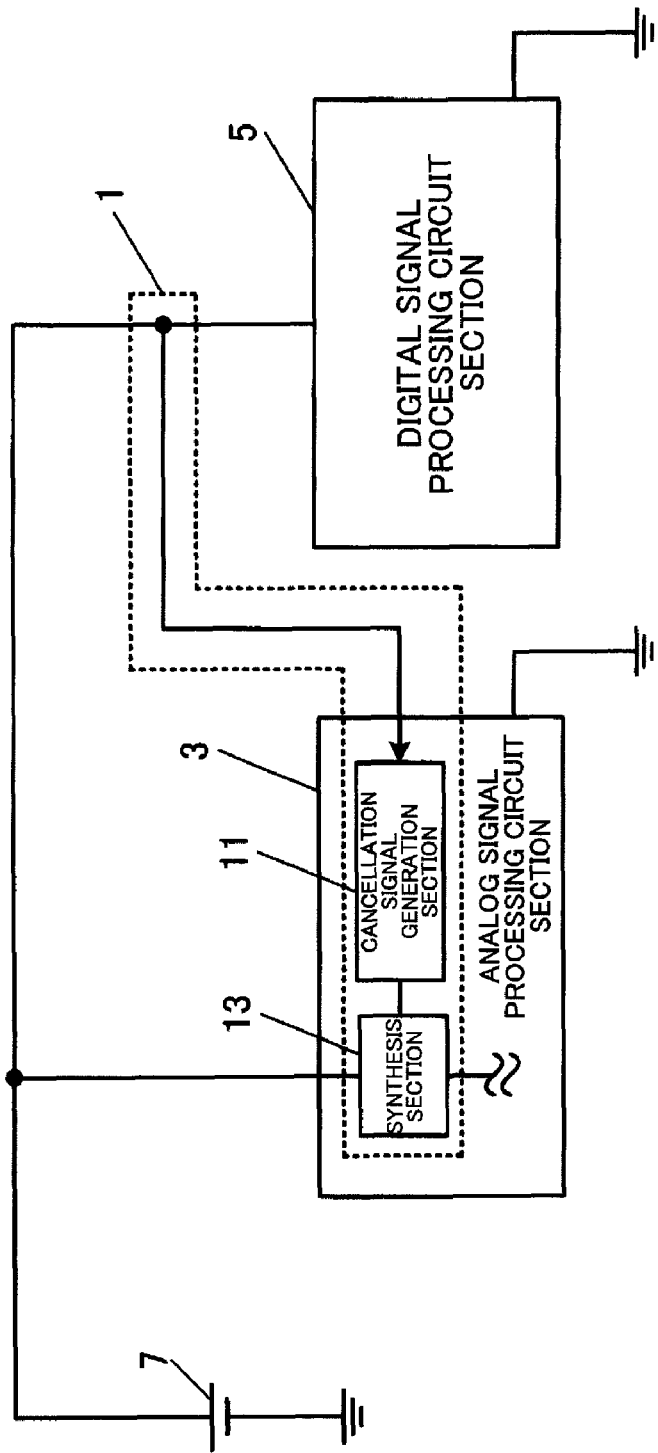
FIG. 3 is a view showing an example of a circuit configuration according to a modification.

As shown in FIG. 3, the noise cancellation circuit 1 may be provided in the power supply input stage of the module of the analog signal processing circuit section 3, and the cancellation signal may be generated and synthesized in the analog signal processing circuit section 3. This further reduces the size of the entire circuit.

2. Examples

Examples when mounting the noise cancellation circuit 1 on a global positioning system (GPS) module are described below.

2-1. Example 1

Figure 4:
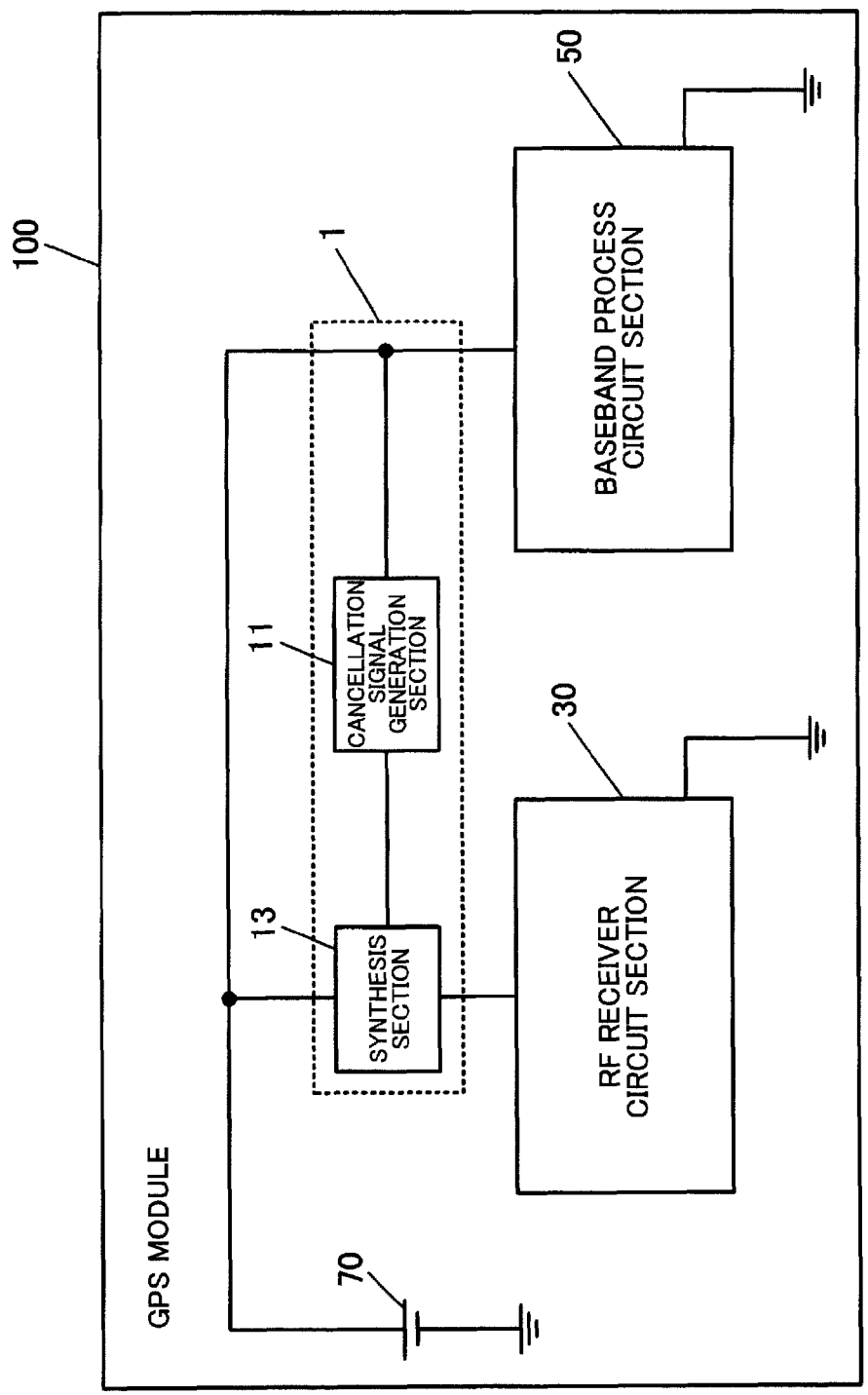
FIG. 4 is a view showing the configuration of a GPS module according to Example 1.

FIG. 4 is a view showing the configuration of a GPS module 100 according to Example 1.

The GPS module 100 includes the noise cancellation circuit 1, a radio frequency (RF) receiver circuit section 30, a baseband process circuit section 50, and a GPS power supply 70.

The RF receiver circuit section 30 is an RF signal receiver circuit. The RF receiver circuit section 30 subjects an RF signal including a GPS satellite signal received by a GPS antenna to amplification and the like, and then down-converts the RF signal into an intermediate-frequency signal (hereinafter referred to as "IF signal"). After subjecting the IF signal to amplification and the like, the RF receiver circuit section 30 converts the IF signal into a digital signal, and outputs the resulting digital signal to the baseband process circuit section 50. The RF receiver circuit section 30 corresponds to the analog signal processing circuit section 3 shown in FIG. 1.

The baseband process circuit section 50 is a circuit section which acquires/extracts the GPS satellite signal by performing a correlation detection process and the like on the IF signal output from the RF receiver circuit section 30, decodes data contained in the GPS satellite signal to extract a navigation message, time information, and the like, and performs pseudo-range calculations, positioning calculations, and the like. The baseband process circuit section 50 corresponds to the digital signal processing circuit section 5 shown in FIG. 1.

The GPS power supply 70 is a power supply circuit for the RF receiver circuit section 30 and the baseband process circuit section 50. The GPS power supply 70 corresponds to the power supply 7 shown in FIG. 1.

In the GPS module 100, the noise cancellation circuit 1 generates the cancellation signal which cancels an alternating-current component which appears in the power supply terminal voltage of the baseband process circuit section 50, and the cancellation signal and a power supply voltage applied to the RF receiver circuit section 30 are then synthesized, whereby an interference wave from the baseband process circuit section 50 and a power supply ripple from the GPS power supply 70 superimposed on the power supply voltage are removed.

2-2. Example 2

Figure 5:
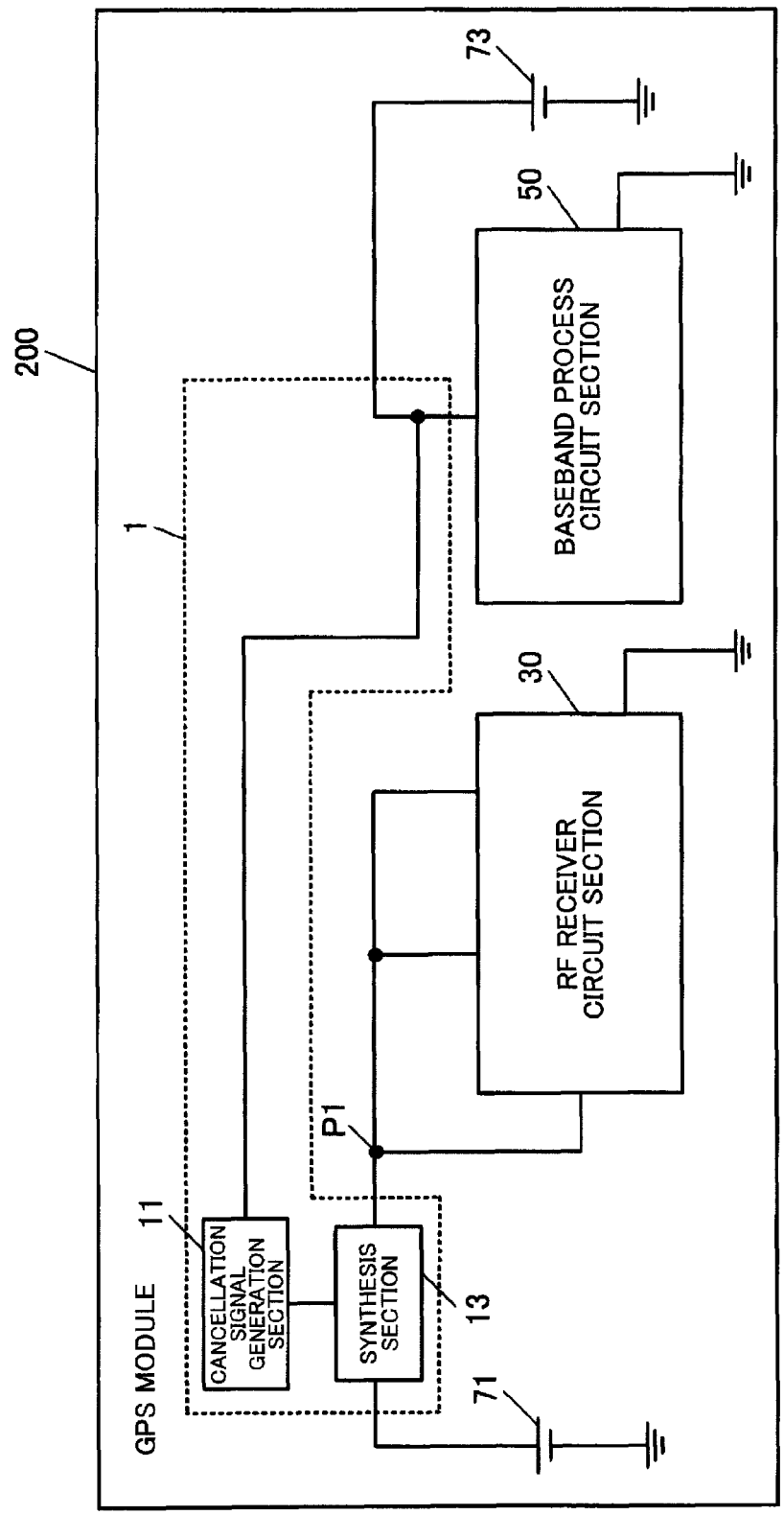
FIG. 5 is a view showing the configuration of a GPS module according to Example 2.

FIG. 5 is a block diagram showing the configuration of a GPS module 200 according to Example 2. The same elements as those of the GPS module 100 are indicated by the same symbols. Description of these elements is omitted. The GPS module 200 includes the noise cancellation circuit 1, an RF receiver circuit section 30, a baseband process circuit section 50, an RF power supply 71, and a baseband power supply 73.

The GPS module 200 differs from the GPS module 100 in that a power supply line of the RF receiver circuit section 30 and a power supply line of the baseband process circuit section 50 are independently provided. Therefore, an interference wave is not mixed into the RF receiver circuit section 30 through the power supply line of the baseband process circuit section 50.

On the other hand, the RF receiver circuit section 30, the baseband process circuit section 50, the RF power supply 71, and the baseband power supply 73 are grounded through a common ground line. Therefore, even if the power supplies and the power supply lines are independently provided, an interference wave from the baseband process circuit section 50 is transmitted to the RF receiver circuit section 30 through the ground line, whereby the interference wave is superimposed on the voltage (power supply voltage) between the power supply potential applied to the RF receiver circuit section 30 and the ground potential.

In this example, in order to remove the interference wave transmitted to the RF receiver circuit section 30 through the ground line and the power supply ripple of the RF power supply 71, the noise cancellation circuit 1 is provided between a power supply terminal of the baseband process circuit section 50 and the power supply line of the RF receiver circuit section 30.

The RF receiver circuit section 30 has three power supply terminals. The voltage of the RF power supply 71 is applied to each power supply terminal. Therefore, the synthesis section 13 of the noise cancellation circuit 1 is provided in the middle of the power supply line from the RF power supply 71 to the RF receiver circuit section 30 at a position closer to the RF power supply 71 than a first branch contact point P1.

In the GPS module 200, the noise cancellation circuit 1 generates the cancellation signal which cancels an alternating-current component which appears in the power supply terminal voltage of the baseband process circuit section 50, and the cancellation signal and a power supply voltage applied to the RF receiver circuit section 30 are then synthesized, whereby the interference wave transmitted from the baseband process circuit section 50 to the RF receiver circuit section 30 through the common ground line and the power supply ripple from the RF power supply 71 are removed.

2-3. Experimental Results

Figure 6:
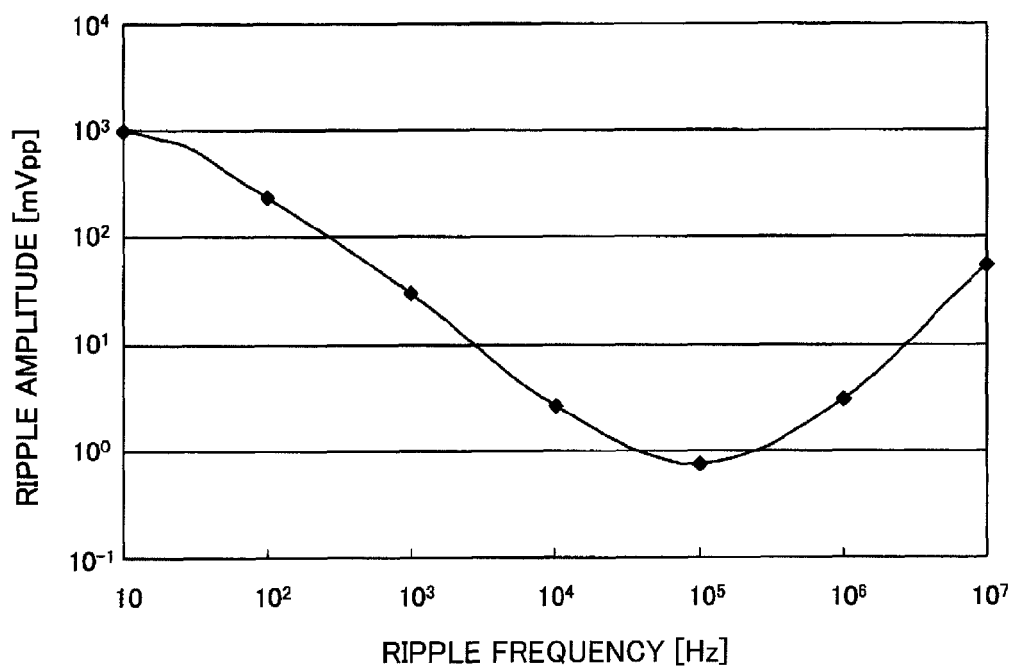
FIG. 6 is a view showing an example of experimental results relating to a power supply ripple.

FIG. 6 shows experimental results of the minimum amplitude (ripple amplitude) of a power supply ripple which may cause deterioration in characteristics of the RF receiver circuit section 30 of the GPS module 200 with respect to the frequency (ripple frequency) of the power supply ripple. FIG. 6 shows a double logarithmic graph of which the horizontal axis indicates the ripple frequency (Hz) and the vertical axis indicates the ripple amplitude (mVpp).

For example, when the ripple frequency is 10 Hz, the ripple amplitude is 1000 mVpp. Therefore, a power supply ripple at a frequency of 10 Hz causes the characteristics of the RF receiver circuit section 30 to deteriorate when the amplitude is 1000 mVpp or more. Likewise, a power supply ripple at a frequency of 100 kHz may cause the characteristics of the RF receiver circuit section 30 to deteriorate when the amplitude is about 1 mVpp or more.

The ripple amplitude becomes minimum at a ripple frequency of 100 kHz, and gradually increases when the ripple frequency exceeds 100 kHz. Therefore, a power supply ripple at a higher frequency and a smaller amplitude does not necessarily tend to cause the characteristics of the RF receiver circuit section 30 to deteriorate.

3. Other Embodiments

The above embodiments illustrate an example in which the cancellation signal is generated from the power supply terminal voltage of the digital signal processing circuit section and is synthesized with the power supply voltage of the analog signal processing circuit section. Note that a configuration may also be employed in which the cancellation signal is generated from the power supply terminal voltage of a first digital signal processing circuit section and is synthesized with the power supply voltage of a second digital signal processing circuit section.

The noise cancellation circuit according to the invention may be provided in various electronic instruments such as a portable telephone, a personal digital assistant (PDA), and a personal computer (PC). For example, noise can be canceled in a portable telephone having a GPS function by providing the GPS module 100 or the GPS module 200 in the portable telephone together with a GPS antenna.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A noise cancellation circuit comprising:
a cancellation signal generation section that generates a cancellation signal using a power supply terminal voltage that is supplied to a baseband process circuit section and a RF receiver circuit section with a common power supply line, the cancellation signal canceling a first alternating-current component of the power supply terminal voltage from a power supply section and a second alternating-current component of the power supply terminal voltage from the baseband process circuit section; and
a synthesis section that synthesizes the cancellation signal and the power supply voltage.

2. The noise cancellation circuit as defined in claim 1, the cancellation signal generation section including:
an extraction section that extracts the alternating-current component of the power supply terminal voltage of the baseband process circuit section; and
a phase shifter section that shifts a phase of a signal of the extracted alternating-current component by 180 degrees.

3. The noise cancellation circuit as defined in claim 1, the baseband process circuit section being a digital signal processing circuit section; and
the RF receiver circuit section being an analog signal processing circuit section.

4. An analog signal processing circuit comprising the RF receiver circuit section that includes the noise cancellation circuit as defined in claim 1 in a power supply input stage.

5. An electronic instrument comprising the noise cancellation circuit as defined in claim 1.

* * * * *